(12) United States Patent (10) Patent No.: US 7,482,299 B2
Masumura et al. (45) Date of Patent: Jan. 27, 2009

(54) DIELECTRIC CERAMIC COMPOSITION AND MULTI-LAYER CERAMIC CAPACITOR

(75) Inventors: Hitoshi Masumura, Niigata (JP); Satoshi Asahi, Niigata (JP); Masatoshi Kobayashi, Niigata (JP)

(73) Assignee: Namics Corporation, Niigata (JP)

( * ) Notice: Subject to any disclaimer, the term of this patent is extended or adjusted under 35 U.S.C. 154(b) by 167 days.

(21) Appl. No.: 11/661,180

(22) PCT Filed: Jun. 12, 2006

(86) PCT No.: PCT/JP2006/311755

§ 371 (c)(1),
(2), (4) Date: Feb. 26, 2007

(87) PCT Pub. No.: WO2007/144931

PCT Pub. Date: Dec. 21, 2007

(65) Prior Publication Data

US 2008/0214382 A1   Sep. 4, 2008

(51) Int. Cl.
*C04B 35/468* (2006.01)
(52) U.S. Cl. .................... 501/139; 501/138; 361/321.4
(58) Field of Classification Search ................. 501/137, 501/138, 139; 361/321.4
See application file for complete search history.

(56) References Cited

U.S. PATENT DOCUMENTS

| 4,882,305 | A | 11/1989 | Chu et al. |
| 6,226,172 | B1 | 5/2001 | Sato et al. |
| 6,403,513 | B1 * | 6/2002 | Sato et al. ................... 501/137 |
| 6,764,976 | B2 * | 7/2004 | Kobayashi et al. .......... 501/139 |

FOREIGN PATENT DOCUMENTS

| JP | 3-23504 B2 | 3/1991 |
| JP | 2000-154057 A | 6/2000 |
| JP | 2001-192264 A | 7/2001 |
| JP | 2002-255639 A | 11/2002 |

* cited by examiner

*Primary Examiner*—Karl E Group
(74) *Attorney, Agent, or Firm*—Frishauf, Holtz, Goodman & Chick, P.C.

(57) ABSTRACT

The present invention provides a dielectric ceramic composition, which is, in addition to having superior resistance to reduction during firing, superior capacitance temperature characteristics after firing and superior dielectric characteristics, also demonstrates an enhanced lifetime for insulation resistance.

The present invention is a dielectric ceramic composition comprising 0.18 to 0.5 part by weight of $Yb_2O_3$, 0.6 to 1.5 parts by weight of MgO, 0.4 to 1.5 parts by weight of $CaSiO_3$, 0.02 to 0.2 part by weight of $WO_3$, 0.1 to 0.4 part by weight of $MnCO_3$ and 0.02 to 0.2 part by weight of $MoO_3$ based on 100 parts by weight of $(BaO)_m \cdot TiO_2$ (wherein, m is from 0.990 to 0.995).

4 Claims, No Drawings

DIELECTRIC CERAMIC COMPOSITION AND MULTI-LAYER CERAMIC CAPACITOR

This application is the U.S. national phase application of International Application PCT/JP2006/311755 filed Jun. 12, 2006.

TECHNICAL FIELD

The present invention relates to a dielectric ceramic composition that can be fired in a reducing atmosphere, and a multi-layer ceramic capacitor having a dielectric layer using the dielectric ceramic composition.

BACKGROUND ART

Multi-layer ceramic capacitors are used for reduced coupling and buffering of the power supplies for processors, and particularly for high-output microprocessors. While operating in a high-output mode, these active electronic components generate a large amount of heat, and the temperature of high-output processors during continuous operation can reach as high as 70 to 80° C. even if subjected to concentrated cooling. On the other hand, these multi-layer ceramic capacitors are also used at ambient environmental temperatures down to −20° C. or lower, for example, in areas having cold climates during winter. In this manner, since multi-layer ceramic capacitors are used over a wide temperature range, they are required to have flat temperature characteristics.

Moreover, dielectric ceramic compositions have recently required to be able to be fired in reducing atmospheres so as to allow the use of base metals such as Ni as well as expensive precious metals such as Pd, Au or Ag in the internal electrodes of multi-layer ceramic capacitors.

Various dielectric ceramic compositions have been developed in response to these requirements (see Japanese Unexamined Patent Publications Nos. 2000-154057, 2001-192264 and 2002-255639). Japanese Unexamined Patent Publication No. 2000-154057 proposes a dielectric ceramic composition at least having a main component in the form of $BaTiO_3$, a first sub-component containing at least one selected from the group consisting of MgO, CaO, BaO, SrO and $Cr_2O_3$, a second sub-component represented by $(Ba,Ca)_xSiO_{2+x}$ (wherein, x=0.8 to 1.2), a third sub-component containing at least one selected from the group consisting of $V_2O_5$, $MoO_3$ and $WO_3$, and a fourth sub-component containing an oxide of R1 (wherein, R1 is at least one selected from the group consisting of Sc, Er, Tm, Yb and Lu); wherein, the ratio of each sub-component to 100 moles of the main component in the form of $BaTiO_3$ is 0.1 to 3 moles for the first sub-component, 2 to 10 moles for the second sub-component, 0.01 to 0.5 moles for the third sub-component and 0.5 to 7 moles for the fourth sub-component (provided that, the number of moles of the fourth sub-component is the ratio of R1 alone).

Japanese Unexamined Patent Publication No. 2001-192264 proposes a dielectric ceramic composition at least having a main component containing barium titanate, a first sub-component containing at least one selected from the group consisting of MgO, CaO, BaO, SrO and $Cr_2O_3$, a second sub-component containing silicon oxide as a main component thereof, a third sub-component containing at least one selected from the group consisting of $V_2O_5$, $MoO_3$ and $WO_3$, a fourth sub-component containing an oxide of R1 (wherein R1 is at least one selected from the group consisting of Sc, Er, Tm, Yb and Lu), and a fifth sub-component containing $CaZrO_3$ or $CaO+ZrO_2$; wherein, the ratio of each component to 100 moles of the main component containing barium titanate is 0.1 to 3 moles for the first sub-component, 2 to 10 moles for the second sub-component, 0.01 to 0.5 moles for the third sub-component, 0.5 to 7 moles for the fourth sub-component (provided that the number of moles of the fourth sub-component is the ratio of R1 alone), and 0<fifth sub-component≦5 moles for the fifth sub-component.

Japanese Unexamined Patent Publication No. 2002-255639 proposes a dielectric ceramic composition having a main component containing barium titanate, a first sub-component containing an oxide of AE (wherein, AE is at least one selected from the group consisting of Mg, Ca, Ba and Sr), and a second sub-component containing an oxide of R (wherein, R is at least one selected from the group consisting of Y, Dy, Ho and Er); wherein, the ratio of each component to 100 moles of the main component is 0 moles<first sub-component<0.1 moles for the first sub-component, and 1 mole<second sub-component<7 moles for the second sub-component.

However, these dielectric ceramic compositions required further improvement with respect to low dielectric constant, and with respect to dielectric characteristics in particular.

DISCLOSURE OF THE INVENTION

Problems to be Solved by the Invention

An object of the present invention is to provide a dielectric ceramic composition having superior reduction resistance during firing, having superior capacitance temperature characteristics and dielectric characteristics after firing, and having an enhanced insulation resistance life. In addition, an object of the present invention is to provide a multi-layer ceramic capacitor having enhanced reliability produced using this dielectric ceramic composition.

Means for Solving the Problems

The present invention is a dielectric ceramic composition containing 0.18 to 0.5 part by weight of $Yb_2O_3$, 0.6 to 1.5 parts by weight of MgO, 0.4 to 1.5 parts by weight of $CaSiO_3$, 0.02 to 0.2 part by weight of $WO_3$, 0.1 to 0.4 part by weight of $MnCO_3$ and 0.02 to 0.2 part by weight of $MoO_3$ based on 100 parts by weight of $(BaO)_m \cdot TiO_2$ (wherein, m is from 0.990 to 0.995). In addition, the present invention is a multi-layer ceramic capacitor having a dielectric layer obtained using the aforementioned dielectric ceramic composition.

Effect of the Invention

According to the present invention, a dielectric ceramic composition is provided which, in addition to having superior resistance to reduction during firing, superior capacitance temperature characteristics after firing and superior dielectric characteristics, also demonstrates an enhanced lifetime for insulation resistance.

For example, a dielectric ceramic composition of the present invention can be fired at, for example, 1240° C. or lower and a low oxygen partial pressure of, for example, $10^{-9}$ to $10^{-12}$ MPa. When a dielectric obtained from this dielectric ceramic composition is used, a multi-layer ceramic capacitor can be obtained having satisfactory capacitance temperature characteristics which satisfy the X5R characteristics of EIA standards, consisting of a high dielectric constant of 3500 or more, dielectric loss (tan δ) of 6% or lower, and a temperature characteristic of capacitance at −55° C. to +85° C. based on capacitance at 25° C. of ±15% or less, a capacitance-insulation resistance product (CR product) at room temperature of 1000 (Ω·F) or more, no occurrence of remarkable deterioration even after 10 hours of high-temperature load, accelerated lifetime testing, and a high field strength of breakdown voltage of 150 V/μm or more in the case of applying a direct current voltage. In other words, since a dielectric ceramic composition of the present invention can be fired in a reducing atmosphere, a multi-layer ceramic capacitor produced using this dielectric ceramic composition is able to use inexpensive base metals instead of conventional precious metals. As a result, the cost of the multi-layer ceramic capacitor can be reduced considerably.

BEST MODE FOR CARRYING OUT THE INVENTION

A dielectric ceramic composition of the present invention contains $(BaO)_m \cdot TiO_2$ (wherein, m is from 0.990 to 0.995). If m is within the range, changes in capacitance attributable to temperature of a multi-layer ceramic capacitor having a dielectric layer obtained by firing the dielectric ceramic composition are suppressed, and the lifetime thereof is long. m is preferably from 0.990 to 0.995, and more preferably from 0.992 to 0.995.

There are no particular limitations on the method used to produce the $(BaO)_m \cdot TiO_2$ (wherein, m is from 0.990 to 0.995). For example, the $(BaO)_m \cdot TiO_2$ can be produced by weighing out $BaCO_3$ and $TiO_2$ so that the ratio of the number of moles of $BaCO_3$ to the number of moles of $TiO_2$ is m:1, and crushing by wet mixing followed by drying and firing for 1 to 3 hours at a temperature of 1000 to 1300° C. Furthermore, $BaCO_3$ forms BaO by releasing carbon dioxide gas a result of being decomposed by firing. $BaC_2O_4$ can be used instead of $BaCO_3$.

A dielectric ceramic composition of the present invention contains 0.18 to 0.5 part by weight, and preferably 0.2 to 0.4 part by weight, of $Yb_2O_3$ to 100 parts by weight of $(BaO)_m \cdot TiO_2$ (wherein, m is the same as previously defined). If the content of $Yb_2O_3$ in the dielectric ceramic composition is within the range, capacitance changes attributable to the temperature of a multi-layer ceramic capacitor having a dielectric layer obtained by firing the dielectric ceramic composition are suppressed, the dielectric constant is sufficiently high, and the lifetime is long.

A dielectric ceramic composition of the present invention contains 0.6 to 1.5 parts by weight, and preferably 0.6 to 1.2 parts by weight, of MgO to 100 parts by weight of $(BaO)_m \cdot TiO_2$ (wherein, m is the same as previously defined). If the content of MgO in the dielectric ceramic composition is within the range, capacitance changes attributable to the temperature of a multi-layer ceramic capacitor having a dielectric layer obtained by firing the dielectric ceramic composition are suppressed, the field strength of breakdown voltage is sufficiently high, the dielectric constant is also sufficiently high, and the lifetime is long.

A dielectric ceramic composition of the present invention contains 0.4 to 1.5 parts by weight, and preferably 0.5 to 1.0 part by weight, of $CaSiO_3$ to 100 parts by weight of $(BaO)_m \cdot TiO_2$ (wherein, m is the same as previously defined). If the content of $CaSiO_3$ in the dielectric ceramic composition is within the range, capacitance changes attributable to the temperature of a multi-layer ceramic capacitor having a dielectric layer obtained by firing the dielectric ceramic composition are suppressed, the dielectric constant is sufficiently high, and the lifetime is long.

A dielectric ceramic composition of the present invention contains 0.02 to 0.2 part by weight, and preferably 0.02 to 0.1 part by weight, of $WO_3$ to 100 parts by weight of $(BaO)_m \cdot TiO_2$ (wherein, m is the same as previously defined). If the content of $WO_3$ in the dielectric ceramic composition is within the range, the CR product of a multi-layer ceramic capacitor having a dielectric layer obtained by firing the dielectric ceramic composition is large, the field strength of breakdown voltage is sufficiently high, and the lifetime is long.

A dielectric ceramic composition of the present invention contains 0.1 to 0.4 part by weight, and preferably 0.2 to 0.4 part by weight, of $MnCO_3$ to 100 parts by weight of $(BaO)_m \cdot TiO_2$ (wherein, m is the same as previously defined). If the content of $MnCO_3$ in the dielectric ceramic composition is within the range, capacitance changes attributable to the temperature of a multi-layer ceramic capacitor having a dielectric layer formed the dielectric ceramic composition are suppressed, the CR product is large, the dielectric constant is sufficiently high, and the lifetime is long.

A dielectric ceramic composition of the present invention contains 0.02 to 0.2 part by weight, and preferably 0.05 to 0.15 part by weight, of $MoO_3$ to 100 parts by weight of $(BaO)_m \cdot TiO_2$ (wherein, m is the same as previously defined). If the content of $MoO_3$ is within the range, capacitance changes attributable to the temperature of a multi-layer ceramic capacitor having a dielectric layer formed by the dielectric ceramic composition are suppressed, the CR product is large, field strength of breakdown voltage is sufficiently high, and the lifetime is long.

A dielectric ceramic composition of the present invention may also contain trace amounts of other oxides and impurities within a range that does not have an effect on the characteristics of a multi-layer ceramic capacitor of the present invention.

A dielectric layer of a multi-layer ceramic capacitor can be formed using a dielectric ceramic composition of the present invention.

There are no particular limitations on the production method of a multi-layer ceramic capacitor, and a multi-layer ceramic capacitor can be produced by, for example, the method described below.

(1) A dielectric ceramic composition of the present invention is printed or coated onto a base material. Optionally, a dielectric ceramic composition of the present invention may be used after mixing with a commonly used component, examples of which include a solvent such as ethanol, toluene, propanol, polyvinyl alcohol or water, a binder such as polyvinyl butyral or ethyl cellulose, and a plasticizer such as butyl benzyl phthalate. Printing or coating is preferably carried out to be a thickness of the dielectric layer of 2.5 to 3.5 µm after firing. There are no particular limitations on the printing or coating method, and can be carried out by screen printing, transfer printing or doctor blade coating and so forth.

(2) Next, a dielectric ceramic composition layer printed or coated in step (1) is dried. Drying is normally carried out by heating for 5 to 10 minutes at 80 to 100° C.

(3) An internal electrode paste is printed or coated on the formed dielectric ceramic composition layer. A nickel or other base metal paste can be preferably used for the internal electrode paste. There are no particular limitations on the printing or coating method. The printing thickness is normally such that the thickness of the internal electrode after firing is 0.8 to 1.2 µm.

(4) Next, the internal electrode paste layer printed in step (3) is dried. Drying is normally carried out by heating for 5 to 10 minutes at 80 to 100° C.

(5) Next, an unfired multi-layer is obtained by repeating the aforementioned steps (1) to (4) until the desired number of layers is obtained.

(6) The unfired multi-layer obtained in this manner is then removed from the base material and cut to produce a multi-layer block followed by firing. The multi-layer block is fired at a firing temperature of 1100 to 1350° C., and preferably 1200 to 1260° C., in an atmosphere having a low oxygen partial pressure in which the oxygen partial pressure $P(O_2)$ is, for example, $10^{-9}$ to $10^{-12}$ MPa. As a result of this firing, the dielectric ceramic composition layer and the internal electrode paste layer become a dielectric layer and an internal electrode, respectively, resulting in the obtaining of a multi-layer ceramic capacitor. Subsequently, reoxidation treatment can be carried out as necessary at 900 to 1100° C. in an $N_2$—$H_2O$ atmosphere.

(7) An external electrode conductive paste is then coated onto the multi-layer ceramic capacitor after the firing, and by subsequently carrying out firing in addition to the previous firing, a pair of external electrodes is formed, allowing the obtaining of a multi-layer ceramic capacitor chip.

EXAMPLES

The following provides an explanation of the present invention according to examples and comparative examples thereof. The present invention is not limited by these examples. The term "part(s)" refers to part(s) by weight in the examples and comparative examples.

Each component was weighed out and blended so as to form the compositions of each sample indicated in Tables 1 and 2. Furthermore, $(BaO)_m \cdot TiO_2$ and $CaSiO_3$ were prepared in the manner described below.

Preparation of $(BaO)_m \cdot TiO_2$ $BaC_2O_4$ and $TiO_2$ were weighed out so that the ratio of the number of moles of $BaC_2O_4$ and number of moles of $TiO_2$ was equal to the ratio of the value of m shown in the Tables 1 and 2. The mixture was then crushed by wet mixing for 6 hours in a ball mill followed by drying and calcining in air for 2 hour at 1100° C. Moreover, after coarsely crushing with a crushing mixer and so forth, the coarsely crushed product was again wet crushed for 20 hours with a ball mill and dried to obtain $(BaO)_m \cdot TiO_2$.

Preparation of $CaSiO_3$

Equimolar amounts of $CaCO_3$ and $SiO_2$ were weighed out, and after crushing by wet mixing for 6 hours with a ball mill, the crushed product was dried and preliminarily fired in air for 2 hours at 800° C. Moreover, after coarsely crushing with a crushing mixer and so forth, the coarsely crushed product was again wet mixed for 20 hours with a ball mill and dried to obtain $CaSiO_3$.

Next, these were crushed by wet mixing with a ball mill after adding ethanol and toluene. After crushing, the mean particle diameter of the particles contained therein was 0.3 μm. Subsequently, a polyvinyl butyral-based binder and butyl benzyl phthalate were added and mixed to prepare a paste. This paste was formed into a sheet by doctor blade coating to obtain a green sheet having a thickness of 2.3 μm. A nickel electrode paste was then screen-printed onto this green sheet and dried followed by layering so as to form mutually opposing electrodes and integrating into a single unit by hot pressing. Furthermore, the nickel electrode paste was prepared by kneading 40 parts by weight of an organic vehicle (consisting of dissolving 8 parts by weight of ethyl cellulose in 92 parts by weight of terpineol) and 10 parts by weight of terpineol with 100 parts by weight of nickel particles having a mean particle diameter of 0.2 μm with a three roll mill to form a paste.

Each multi-layer block for a capacitor was cut away using a blade from the multi-layer that had been integrated into a single unit by hot pressing. The multi-layer blocks obtained in this manner were heated to 500° C. in an atmosphere having a volume ratio of $H_2:N_2$ of 1:99 to cause combustion of the binder followed by firing for 2 hours at the firing temperatures indicated in Tables 1 and 2 in a reducing atmosphere composed of $H_2$—$N_2$—$H_2O$ having an oxygen partial pressure of $10^{-9}$ to $10^{-12}$ MPa. Subsequently, the multi-layer blocks were reoxidized at 1000° C. in an $N_2$—$H_2O$ atmosphere to obtain a multi-layer ceramic capacitor.

A copper electrode paste was coated onto the surface of the resulting multi-layer ceramic capacitor followed by baking at 900° C. in a neutral atmosphere to form an external electrode and obtain a multi-layer ceramic capacitor chip. The dimensions of the multi-layer ceramic capacitor chip produced in this example are as shown below.

External dimensions: width=1.4 mm, length=2.1 mm, thickness=0.4 mm

Dielectric thickness: t=1.6 μm

Effective number of layers: N=29

Various characteristics were measured for each of the samples of the example. The measuring methods are as described below.

Capacitance (C) and dielectric loss (tan δ): Measurements were made at 1 KHz and 0.5 Vrms with an automated bridge using a capacitance meter (Hewlett-Packard, Model 4278A).

Insulation resistance (R): The resistance value was measured after applying a voltage of 6.3 V for 1 minute to a multi-layer ceramic capacitor using a high insulation resistance measuring instrument (Toa, Model DSM-8541 Digital Super Megohmmeter), and this value was used as the value of insulation resistance (R).

CR product: The product of the aforementioned capacitance (C) and insulation resistance (R) was determined.

Temperature characteristic of capacitance: This indicates the maximum value of the rate of change in capacitance over a temperature range from −55° C. to 85° C. based on the capacitance at 25° C. Furthermore, since the absolute value of the rate of capacitance change over temperature was the largest at 85° C. for all samples, the rate of capacitance change at 85° C. is shown in the tables.

High-temperature load accelerated lifetime testing (HALT): 10 test pieces for each sample were placed in a constant temperature bath (thermostat) at 105° C. followed by the application of a direct current voltage of 25 V and measurement of insulation resistance in the presence of a direct current electric field. The time period until the insulation resistance reached $1 \times 10^6$ Ω or less after the voltage was applied was taken to be the lifetime.

Field strength of breakdown voltage (VB): A direct current voltage was applied to the samples at a voltage increase rate of 10 V/sec followed by measurement of the voltage when a 5 mA leakage current was observed. The field strength of breakdown voltage (VB) was determined by dividing this voltage by the thickness of the dielectric.

Tables 1 and 2 show the measurement results. Those examples indicated with an asterisk (*) next to the number are comparative examples, while those not indicated with an asterisk (*) are examples of the present invention.

TABLE 1

| Example | Main component $(BaO)_m \cdot TiO_2$ m | Blended components (parts by weight based on 100 by weight of main component) | | | | | |
|---|---|---|---|---|---|---|---|
| | | $Yb_2O_3$ | MgO | $CaSiO_3$ | $WO_3$ | $MnCO_3$ | $MoO_3$ |
| *1  | 1.004 | 0.25 | 0.9 | 0.7 | 0.06 | 0.3 | 0.1 |
| *2  | 0.998 | 0.25 | 0.9 | 0.7 | 0.06 | 0.3 | 0.1 |
| 3   | 0.995 | 0.25 | 0.9 | 0.7 | 0.06 | 0.3 | 0.1 |
| 4   | 0.992 | 0.25 | 0.9 | 0.7 | 0.06 | 0.3 | 0.1 |
| 5   | 0.990 | 0.25 | 0.9 | 0.7 | 0.06 | 0.3 | 0.1 |
| *6  | 0.985 | 0.25 | 0.9 | 0.7 | 0.06 | 0.3 | 0.1 |
| *7  | 0.994 | 0.15 | 0.9 | 0.8 | 0.06 | 0.3 | 0.1 |
| 8   | 0.994 | 0.18 | 0.9 | 0.8 | 0.06 | 0.3 | 0.1 |
| 9   | 0.994 | 0.3  | 0.9 | 0.8 | 0.06 | 0.3 | 0.1 |
| 10  | 0.994 | 0.4  | 0.9 | 0.8 | 0.06 | 0.3 | 0.1 |
| 11  | 0.994 | 0.5  | 0.9 | 0.8 | 0.06 | 0.3 | 0.1 |
| *12 | 0.994 | 0.6  | 0.9 | 0.8 | 0.06 | 0.3 | 0.1 |
| *13 | 0.994 | 0.25 | 0.4 | 0.8 | 0.08 | 0.3 | 0.1 |
| 14  | 0.994 | 0.25 | 0.6 | 0.8 | 0.08 | 0.3 | 0.1 |
| 15  | 0.994 | 0.25 | 0.9 | 0.8 | 0.08 | 0.3 | 0.1 |
| 16  | 0.994 | 0.25 | 1.2 | 0.8 | 0.08 | 0.3 | 0.1 |
| 17  | 0.994 | 0.25 | 1.5 | 0.8 | 0.08 | 0.3 | 0.1 |
| *18 | 0.994 | 0.25 | 1.7 | 0.8 | 0.08 | 0.3 | 0.1 |

| Example | Firing temperature ° C. | Dielectric constant $\epsilon$ | Dielectric loss tan δ % | Temperature characteristic of capacitance +85° C. (%) | CR product $\Omega \cdot F$ | Field strength of breakdown voltage V/μm (DC) | Mean lifetime hr |
|---|---|---|---|---|---|---|---|
| *1  | 1280 | 4000 | 6.8 | −16.5 | 2000 | 165 | 3.3 |
| *2  | 1250 | 4100 | 6   | −16.2 | 2000 | 165 | 5 |
| 3   | 1240 | 4200 | 5.7 | −13.5 | 2000 | 160 | 10 or more |
| 4   | 1240 | 4200 | 5.7 | −14.0 | 2000 | 160 | 10 or more |
| 5   | 1230 | 4000 | 4.8 | −13.0 | 2000 | 160 | 10 or more |
| *6  | 1200 | 3500 | 4.2 | −12.0 | 2000 | 150 | 4 |
| *7  | 1230 | 4400 | 6.2 | −16.5 | 1500 | 150 | 6 |
| 8   | 1230 | 4300 | 6   | −14.5 | 1800 | 160 | 10 or more |
| 9   | 1230 | 4200 | 5.7 | −13.3 | 2000 | 160 | 10 or more |
| 10  | 1230 | 3900 | 5.6 | −13.5 | 2000 | 160 | 10 or more |
| 11  | 1230 | 3500 | 4.8 | −11.7 | 2300 | 160 | 10 or more |
| *12 | 1230 | 3000 | 4.8 | −10.2 | 2000 | 150 | 2 |
| *13 | 1230 | 4500 | 5.5 | −15.4 | 1500 | 120 | 5 |
| 14  | 1240 | 4300 | 5.7 | −14.0 | 2000 | 150 | 10 or more |
| 15  | 1240 | 4200 | 5.7 | −13.3 | 2000 | 160 | 10 or more |
| 16  | 1240 | 4200 | 5.7 | −13.5 | 2000 | 165 | 10 or more |
| 17  | 1240 | 3700 | 5.3 | −13.0 | 2300 | 165 | 10 or more |
| *18 | 1240 | 3300 | 5.2 | −12.8 | 2300 | 165 | 10 or more |

TABLE 2

| Example | Main component $(BaO)_m \cdot TiO_2$ m | Blended components (parts by weight based on 100 parts by weight of main component) | | | | | |
|---|---|---|---|---|---|---|---|
| | | $Yb_2O_3$ | MgO | $CaSiO_3$ | $WO_3$ | $MnCO_3$ | $MoO_3$ |
| *19 | 0.994 | 0.25 | 0.9 | 0.2 | 0.08 | 0.3  | 0.1 |
| 20  | 0.994 | 0.25 | 0.9 | 0.4 | 0.08 | 0.3  | 0.1 |
| 21  | 0.994 | 0.25 | 0.9 | 0.8 | 0.08 | 0.3  | 0.1 |
| 22  | 0.994 | 0.25 | 0.9 | 1.0 | 0.08 | 0.3  | 0.1 |
| 23  | 0.994 | 0.25 | 0.9 | 1.5 | 0.08 | 0.3  | 0.1 |
| *24 | 0.994 | 0.25 | 0.9 | 2.0 | 0.08 | 0.3  | 0.1 |
| *25 | 0.994 | 0.25 | 0 9 | 0.8 | 0    | 0.3  | 0.1 |
| 26  | 0.994 | 0.25 | 0.9 | 0.8 | 0.02 | 0.3  | 0.1 |
| 27  | 0.994 | 0.25 | 0.9 | 0.8 | 0.06 | 0.3  | 0.1 |
| 28  | 0.994 | 0.25 | 0.9 | 0.8 | 0.1  | 0.3  | 0.1 |
| 29  | 0.994 | 0.25 | 0.9 | 0.8 | 0.2  | 0.3  | 0.1 |
| *30 | 0.994 | 0.25 | 0.9 | 0.8 | 0.3  | 0.3  | 0.1 |
| *31 | 0.994 | 0.25 | 0.9 | 0.8 | 0.06 | 0.05 | 0.1 |
| 32  | 0.994 | 0.25 | 0.9 | 0.8 | 0.06 | 0.1  | 0.1 |
| 33  | 0.994 | 0.25 | 0.9 | 0.8 | 0.06 | 0.2  | 0.1 |
| 34  | 0.994 | 0.25 | 0.9 | 0.8 | 0.06 | 0.4  | 0.1 |
| *35 | 0.994 | 0.25 | 0.9 | 0.8 | 0.06 | 0.6  | 0.1 |
| *36 | 0.994 | 0.25 | 0.9 | 0.8 | 0.06 | 0.3  | 0.1 |
| 37  | 0.994 | 0.25 | 0.9 | 0.8 | 0.06 | 0.3  | 0.02 |

TABLE 2-continued

| | | | | | | | |
|---|---|---|---|---|---|---|---|
| 38 | 0.994 | 0.25 | 0.9 | 0.8 | 0.06 | 0.3 | 0.1 |
| 39 | 0.994 | 0.25 | 0.9 | 0.8 | 0.06 | 0.3 | 0.2 |
| *40 | 0.994 | 0.8 | 0.9 | 0.8 | 0.06 | 0.3 | 0.3 |

| Example | Firing temperature °C. | Dielectric constant $\epsilon$ | Dielectric loss tan δ % | Temperature characteristic of capacitance +85° C. (%) | CR product Ω·F | Field strength of breakdown voltage V/μm (DC) | Mean lifetime hr |
|---|---|---|---|---|---|---|---|
| *19 | 1240 | 4400 | 7.2 | −15.9 | 2000 | 150 | 6 |
| 20 | 1240 | 4300 | 5.7 | −14.8 | 2000 | 150 | 10 or more |
| 21 | 1240 | 4200 | 5.7 | −13.3 | 2000 | 160 | 10 or more |
| 22 | 1240 | 4000 | 5.5 | −13.2 | 2000 | 160 | 10 or more |
| 23 | 1240 | 3800 | 5 | −13.5 | 2000 | 160 | 10 or more |
| *24 | 1240 | 3000 | 5 | −13.5 | 2000 | 160 | 10 or more |
| *25 | 1240 | 3900 | 5.7 | −13.8 | 970 | 130 | 2 |
| 26 | 1240 | 4000 | 5.6 | −13.6 | 2000 | 150 | 10 or more |
| 27 | 1240 | 4200 | 5.7 | −13.7 | 2000 | 160 | 10 or more |
| 28 | 1240 | 4100 | 5.7 | −13.3 | 2000 | 160 | 10 or more |
| 29 | 1240 | 3900 | 5.3 | −13.6 | 2000 | 160 | 10 or more |
| *30 | 1240 | 3700 | 5.5 | −13.5 | 900 | 120 | 2 |
| *31 | 1240 | 4300 | 6 | −15.2 | 900 | 150 | 3 |
| 32 | 1240 | 4200 | 5.8 | −14.6 | 2000 | 150 | 10 or more |
| 33 | 1240 | 4200 | 5.7 | −13.7 | 2000 | 160 | 10 or more |
| 34 | 1240 | 3600 | 5 | −13.2 | 2000 | 160 | 10 or more |
| *35 | 1240 | 3300 | 4.2 | −13.0 | 2000 | 160 | 10 or more |
| *36 | 1240 | 4200 | 5.7 | −13.8 | 3000 | 140 | 1 |
| 37 | 1240 | 4200 | 5.7 | −13.6 | 2000 | 160 | 10 or more |
| 38 | 1240 | 4200 | 5.7 | −13.3 | 2000 | 160 | 10 or more |
| 39 | 1240 | 4300 | 5.9 | −13.5 | 1500 | 160 | 10 or more |
| *40 | 1240 | 4400 | 6.7 | −14.5 | 900 | 130 | 5 |

In Comparative Examples 1 and 2 in which the value of m of $(BaO)_m \cdot TiO_2$ is 1.004 and 0.998, respectively, the absolute values of the temperature characteristic of capacitance were larger than 15%, and the lifetimes were short. Lifetime was also short in Comparative Example 6 in which the value of m is 0.985. In contrast, Examples 3 to 5 of the present invention demonstrated satisfactory values for all characteristics.

In Comparative Example 7 in which the blended amount of $Yb_2O_3$ is 0.15 part by weight, the absolute value of the temperature characteristic of capacitance was larger than 15% and the lifetime was short. In Comparative Example 12 in which the blended amount of $Yb_2O_3$ is 0.6 part by weight, the dielectric constant was small and the lifetime was short. In contrast, Examples 8 to 11 demonstrated satisfactory values for all characteristics.

In Comparative Example 13 in which the blended amount of MgO is 0.4 part by weight, the absolute value of the temperature characteristic of capacitance was larger than 15%, the field strength of breakdown voltage was low at 150 V/μm or less, and the lifetime was short. In Comparative Example 18 in which the blended amount of MgO is 1.7 parts by weight, the dielectric constant was small at less than 3500. In contrast, Examples 14 to 17 of the present invention demonstrated satisfactory values for all characteristics.

In Comparative Example 19 in which the blended amount of $CaSiO_3$ is 0.2 part by weight, the absolute value of the temperature characteristic of capacitance was larger than 15% and the lifetime was short. In Comparative Example 24 in which the blended amount of $CaSiO_3$ is 2.0 parts by weight, the dielectric constant was small at less than 3500. In contrast, Examples 20 to 23 of the present invention demonstrated satisfactory values for all characteristics.

In Comparative Example 25 in which the blended amount of $WO_3$ is 0 part by weight, the CR product was 1000 or less, the field strength of breakdown voltage was low at 150 V/μm or less, and the lifetime was short. In Comparative Example 30 in which the blended amount of $WO_3$ is 0.3 part by weight, the CR product was 1000 or less, the field strength of breakdown voltage was low at 150 V/μm or less, and the lifetime was short. In contrast, Examples 26 to 29 of the present invention demonstrated satisfactory values for all characteristics.

In Comparative Example 31 in which the blended amount of $MnCO_3$ is 0.05 part by weight, the absolute value of the temperature characteristic of capacitance was larger than 15%, the CR product was 1000 or less, and the lifetime was short. In Comparative Example 35 in which the blended amount of $MnCO_3$ is 0.6 part by weight, the dielectric constant was small at less than 3500. In contrast, Examples 32 to 34 of the present invention demonstrated satisfactory values for all characteristics.

In Comparative Example 36 in which the blended amount of $MoO_3$ is 0 part by weight, the field strength of breakdown voltage was low at 150 V/μm or less, and the lifetime was short. In Comparative Example 40 in which the blended amount of $MoO_3$ is 0.3 part by weight, the CR product was 1000 or less, the field strength of breakdown voltage was low at 150 V/μm or less, and the lifetime was short. In contrast, Examples 37 to 39 of the present invention demonstrated satisfactory values for all characteristics.

INDUSTRIAL APPLICABILITY

According to the present invention, a dielectric ceramic composition is provided which, in addition to having superior resistance to reduction during firing, superior capacitance temperature characteristics after firing and superior dielectric characteristics, also demonstrates an enhanced lifetime for insulation resistance. Electronic components such as multilayer ceramic capacitors produced using this dielectric ceramic composition are highly reliable and have considerable industrial usefulness.

The invention claimed is:

1. A dielectric ceramic composition comprising:
0.18 to 0.5 part by weight of $Yb_2O_3$;
0.6 to 1.5 parts by weight of MgO;
0.4 to 1.5 parts by weight of $CaSiO_3$;
0.02 to 0.2 part by weight of $WO_3$;
0.1 to 0.4 part by weight of $MnCO_3$;
0.02 to 0.2 part by weight of $MoO_3$; and
100 parts by weight of $(BaO)_m \cdot TiO_2$ (wherein, m is from 0.990 to 0.995).

2. A multi-layer ceramic capacitor having a dielectric layer formed from the dielectric ceramic composition according to claim 1.

3. A dielectric ceramic composition comprising:
0.2 to 0.4 part by weight of $Yb_2O_3$;
0.6 to 1.2 parts by weight of MgO;
0.5 to 1.0 parts by weight of $CaSiO_3$;
0.02 to 0.1 part by weight of $WO_3$;
0.2 to 0.4 part by weight of $MnCO_3$;
0.05 to 0.15 part by weight of $MoO_3$; and
100 parts by weight of $(BaO)_m \cdot TiO_2$ (wherein, m is from 0.992 to 0.995).

4. A multi-layer ceramic capacitor having a dielectric layer formed from the dielectric ceramic composition according to claim 3.

* * * * *